United States Patent [19]

Cost

[11] Patent Number: 5,307,678
[45] Date of Patent: May 3, 1994

[54] MATERIAL LEVEL PROBE HAVING CRIMP SEAL

[75] Inventor: Evan Cost, Philadelphia, Pa.

[73] Assignee: Drexelbrook Engineering Co., Horsham, Pa.

[21] Appl. No.: 72,925

[22] Filed: Jun. 7, 1993

[51] Int. Cl.⁵ .................. G01F 23/26; H01G 5/28
[52] U.S. Cl. ................... 73/304 C; 29/25.41; 29/825; 361/284
[58] Field of Search ............... 73/304 C; 29/518, 825; 361/284

[56] References Cited

U.S. PATENT DOCUMENTS

| | | | |
|---|---|---|---|
| 2,800,523 | 7/1957 | Sidenmark et al. | 29/518 X |
| 3,119,266 | 1/1964 | Atkinson | 73/304 R |
| 4,135,296 | 1/1979 | Kami et al. | 29/517 X |
| 4,499,640 | 2/1985 | Brenton et al. | 73/304 C X |
| 4,499,641 | 2/1985 | Fleckenstein . | |
| 4,549,245 | 10/1985 | Fleckenstein . | |
| 4,809,129 | 2/1989 | Hansen, III et al. | 73/304 C X |
| 4,811,160 | 3/1989 | Fleckenstein . | |

Primary Examiner—Daniel M. Yasich
Attorney, Agent, or Firm—Woodcock, Washburn, Kurtz, Mackiewicz & Norris

[57] ABSTRACT

A level measuring probe in which all potential leakage paths are closed by concentrically shrinking the outmost diametrical surface of the probe by some mechanical means such as a crimper or rotary swager to provide sufficient force to substantially uniformly deform the ground, guard, and active elements and insulators around the circumference of the probe such that multiple seals are created. A circumferential notch is preferably provided in the active probe element at the point of the crimping or swaging to provide "blowout protection" whereby the active probe electrode is held in place when used in a high pressure vessel. A pressure seal between the electrodes and insulation material is also maintained by using an elastomeric insulator which returns to its original shape after heating or a thin electrode which "gives" a little when the insulator expands radially during heating. The arrangement of the invention thus eliminates the need for costly machined parts and bushings to provide pressure seals.

30 Claims, 2 Drawing Sheets

MATERIAL LEVEL PROBE HAVING CRIMP SEAL

BACKGROUND OF THE INVENTION

1. Field of the Invention

The present invention relates to a material level probe having a pressure seal formed by crimping or swaging the probe with sufficient force to deform the ground, shield, and active elements and insulators such that multiple seals are created in a substantially uniform manner around the circumference of the probe. The probe of the invention is preferably used to measure the level of a material in a storage vessel by mounting the probe on the storage vessel and measuring capacitive and/or admittance differences among the probe elements due to the material in the container.

2. Description of the Prior Art

The present invention addresses the problem of obtaining and maintaining an inexpensive pressure seal on a level measuring probe or sensing element. In the prior art, level measuring probes typically have been sealed against pressure by compressing a bushing into a gland using a compression plug to form a seal against the conductor or conductors that form the probe. A level measuring probe having a seal of this type is shown in FIG. 1.

As illustrated in FIG. 1, conventional level measuring probes comprise a conductive measuring element 10 formed of materials such as carbon steel, stainless steel and the like which is enclosed within an insulator 12 formed of an elastomeric or polymeric insulating material. In the three terminal type probe structure shown in FIG. 1, the measuring element 10 and insulator 12 are telescopically disposed within a guard electrode 14 which is, in turn, surrounded by a second insulator 16 formed similar to insulator 12. As shown, elements 10-16 are preferably telescopically disposed such that measuring element 10 and guard electrode 14 are exposed yet insulated from each other. As shown, guard electrode 14 extends through to the proximal end of the probe where it is connected to a lead 18. A ground to the vessel in which the probe is mounted is provided at ground electrode 20 of a gland 22 as shown.

As known by those skilled in the art, level measuring probes of the type illustrated in FIG. 1 are often mounted in containers under high pressure and are accordingly pressure sealed to prevent leakage of the potentially hazardous substances in the containers. For this purpose, gland 22 is provided for accepting a Teflon bushing 24 which is forced tightly into the gland 22 by a compression plug 26. Elements 22-26 together provide a tight pressure seal against leaks among guard electrode 14, insulation layer 16, and ground electrode 20. A tight pressure seal is similarly formed among measuring element 10, insulator 12, and guard electrode 14 by inserting a screw 28 into the proximal end of measuring element 10, surrounding screw 28 by a bushing 30, and then compressing bushing 30 into the spaces between measuring element 10 and guard electrode 14 using a compression plug 32.

A pressure seal of the type illustrated in FIG. 1 works quite effectively but requires costly machined parts such as gland 22, compression plugs 26 and 32, and screw 28 in order to provide the necessary pressure seal. Also, the compression plugs must be readjusted after the probe has been subjected to extreme temperature variations if a tight seal is to be maintained. It is desired to eliminate the costly machined parts and bushings used in such seals in order to provide a less expensive level measuring probe which need not be periodically readjusted.

One known mechanism for providing a pressure seal between the probe and the guard electrode without using machined glands and plugs is described by Fleckenstein in U.S. Pat. Nos. 4,499,641, 4,549,245 and 4,811,160. Fleckenstein therein describes a molded level measuring probe in which the desired pressure seal is obtained by injection molding the insulation material so that it forms an integral piece which surrounds the rod-shaped measuring element between the measuring element and the guard shield. The effects of shrinkage of the insulation material after the injection molding is minimized by injection molding a lip at a distal end of the probe which radially overlaps the distal end of the guard shield so that the guard shield edge is squeezed during cooling of the insulation material to form a tight, pressure resistance seal between the guard shield and the measuring element. A notch is also formed in the measuring element so that the insulating material filling the notch may form a shoulder which holds the measuring element in its axial position.

However, it has been found that the lip at the distal end of the probe alone does not provide a sufficient seal when the probe is subjected to extreme heating and subsequent cooling. In other words, because the insulation material expands during heating and generally does not return to its exact shape upon cooling, leakage paths are formed between the guard shield and the insulation layer, even at the lip. Nevertheless, the Fleckenstein probe maintains a pressure seal because any material entering the probe through such a leakage path has no path out the proximal end of the probe. In other words, because the guard shield does not extend the length of the probe, there is no leakage path along the guard shield out the proximal end of the probe. Unfortunately, however, since the guard shield does not extend the length of the probe, material which enters the probe or even air gaps formed within the probe as a result of heating and cooling cycles will get between the guard shield and measuring element so as to adversely affect the measured capacitance and admittance between the guard shield and the measuring element.

An improved pressure seal configuration is thus desired which provides an improved pressure seal between the guard electrode and the measuring element and also provides an improved pressure seal between the ground electrode and the guard electrode or, in the case of a two terminal probe, between the ground electrode and the measuring element. A pressure seal is also desired which holds the elements of assembled or molded probes together while sealing all of the potential leakage paths formed by heating and cooling cycles of the probe without affecting the probe's measurements. The present invention has been designed for this purpose.

Fleckenstein observed that an improved seal between the guard electrode and the probe could be formed by crimping or squeezing the tip of the guard shield around the insulation layer between the guard shield and the measuring element so that leakage paths between the guard shield and the measuring element may be substantially closed. However, as also noted by Fleckenstein, crimping of the guard shield tip has heretofore been undesirable since it requires an extra assembly operation during manufacture of the level measuring device and has not heretofore been entirely effective. As a result, the beneficial uses of crimping, swaging, and the like for providing pressure seals in level measuring devices has not been adequately explored. The present invention has been designed to overcome this shortcoming in the prior art and to provide an inexpensive yet effective pressure seal consistent with the above objectives.

SUMMARY OF THE INVENTION

The present invention relates to a material level measuring probe which has a pressure seal formed by crimping or swaging the probe in such a manner that all leakage paths are closed. In particular, crimp or swage-type seals for three terminal or two terminal probes are formed by crimping or swaging an assembled or molded probe so as to concentrically shrink the outermost diametrical surface with sufficient force to deform the ground, shield, and active elements and the insulators therebetween such that multiple pressure seals are created. By deforming the materials in a substantially uniform manner around the circumference of the probe, all possible leak paths are sealed. Preferably, a circumferential notch is provided in the rod of the measuring element at the point of the crimping or swaging so as to prevent the measuring element from "blowing out" of the assembly during use of the assembly in a high pressure vessel.

A preferred embodiment of a two-terminal probe for measuring the level of a material in a container in accordance with the invention preferably comprises a rod-shaped probe element, a ground element, an insulating layer between the probe element and the ground element, a seal for sealing all leakage paths among the probe element, the ground element and the insulating layer, and mounting means such as a flange or pipe nipple for mounting the probe in the container for measurement of the level of the material. Preferably, the probe element is rod-shaped and has a central axis and a circumferential notch along the central axis thereof. The ground element, on the other hand, is preferably tubular in shape and disposed so as to coaxially surround and be radially spaced from the probe element. Preferably, the ground element also has a length along the central axis which is shorter than a length of the probe element along the central axis so that the probe element projects from one end of the ground element in a telescopic manner. To provide maximum insulation, the insulating layer is formed of a suitably elastic elastomeric or polymeric material and is assembled or injection molded so as to completely surround the probe element between the ground element and the probe element to thereby insulate the ground element from the probe element without forming leakage paths as a result of heating and cooling of the probe element and insulation layer. The seal is then formed along the central axis of the probe element at a position above the circumferential notch by substantially uniformly deforming the ground element and the insulating layer in a radially inward direction towards the probe element using a rotary swager or hydraulic crimping means.

A preferred embodiment of a three-terminal probe for measuring the level of a material in a container in accordance with the invention is similar to the two terminal probe embodiment except that it further comprises a tubular guard element and a second insulating layer between the guard element and the ground element. Also, in the three-terminal embodiment, the seal is formed by crimping or swaging with sufficient force to close all leakage paths among the measuring element, the guard electrode, the ground electrode and the respective insulation layers.

The invention also relates to a method of manufacturing a two-terminal assembled probe for measuring the level of a material in a container. Such an assembled probe is manufactured in accordance with the invention by performing the steps of:

providing a rod-shaped probe element having a central axis;

inserting the probe element into a tubular insulating layer which coaxially surrounds and is radially spaced from the probe element after insertion of the probe element, the insulating layer completely surrounding the probe element;

inserting the probe element and the insulating layer into a tubular ground element which coaxially surrounds and is radially spaced from the insulating layer after insertion of the probe and the insulating layer, the ground element having a length along the central axis which is shorter than a length of the probe element along the central axis whereby the probe element projects from one end of the ground element and is separated from the ground element by the insulating layer;

forming a seal along the central axis of the probe element by substantially uniformly deforming the ground element and the insulating layer in a radially inward direction towards the probe element until all leakage paths among the probe element, the ground element and the insulating layer are substantially eliminated; and inserting a resulting assembly into mounting means which function to mount the assembly within the container for measurement of the level of the material.

In accordance with a preferred method of manufacturing an assembled probe in accordance with the invention, the seal forming step comprises the steps of inserting the assembly into a rotary swager and substantially uniformly deforming the ground element and the insulating layer in the radially inward direction towards the probe element using the rotary swager. On the other hand, the seal forming step may comprise the step of crimping the assembly to substantially uniformly deform the ground element and the insulating layer in the radially inward direction towards the probe element using a hydraulic crimping device. Of course, a three-terminal assembled probe may be manufactured using similar techniques except that the guard element and an additional insulation layer are inserted prior to formation of the seal.

The method of manufacturing a molded probe for measuring the level of a material in a container in accordance with the invention is also described wherein the insulation layer is formed by injection molding the insulation material in a one-piece unitary construction surrounding the probe element between the probe element and the ground element such that the insulation material completely insulates the probe element from the ground element. A three-terminal molded probe may be manufactured using similar techniques except that the guard element and an additional insulation layer are inserted prior to formation of the seal.

BRIEF DESCRIPTION OF THE DRAWINGS

The above and other objects and advantages of the invention will become more apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

A probe and a technique for manufacturing assembled or molded two or three-terminal probes which afford the abovementioned and other beneficial features in accordance with presently preferred exemplary embodiments of the invention will be described below with reference to FIGS. 2 and 3. Those skilled in the art will readily appreciate that the description given herein with respect to those figures is for explanatory purposes only and is not intended in any way to limit the scope of the invention. For example, the present invention may be used to seal hand assembled probes whereby the insulation layers are machined to have inside and outside diameters within a certain tolerance or to seal injection molded probes in which the insulation layers are formed by injection molding the insulation material and then cooling. The probe of the invention may also be mounted in a vessel using standard pipe nipples for thread mounting or flanges for flange mounting. Accordingly, any questions regarding the scope of the invention should be resolved by referring to the appended claims.

Figure 1:
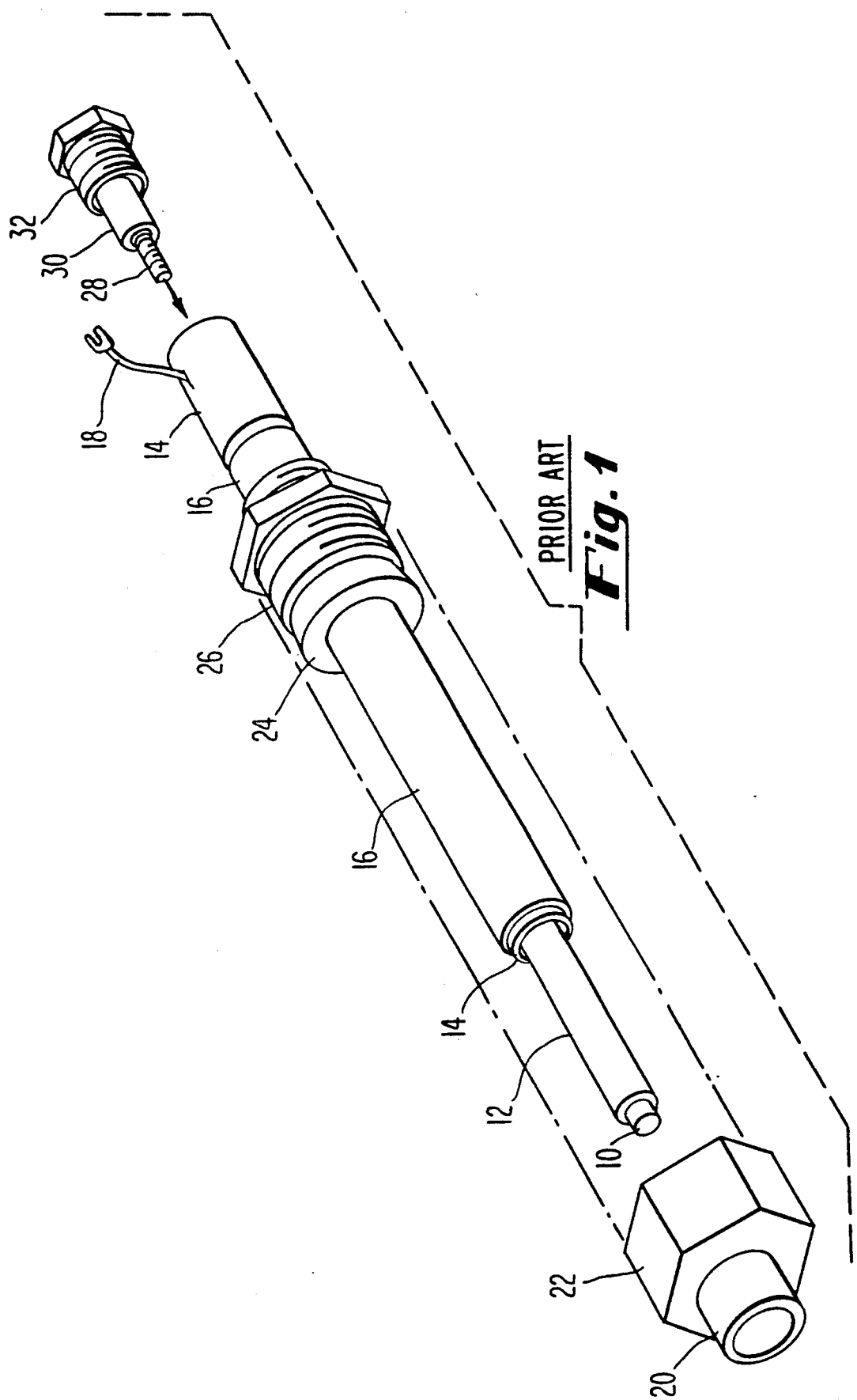
FIG. 1 illustrates an elevational view of a prior art level measuring probe having pressure seals formed by compressing a bushing into a gland using a compression plug.
Figure 2:
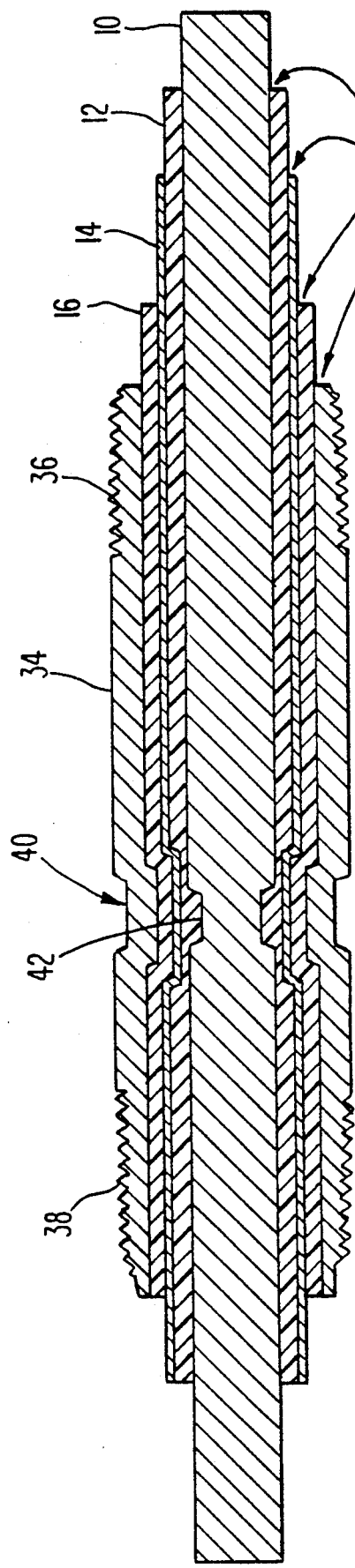
FIG. 2 illustrates a cross-sectional view of a three-terminal probe which is pressure sealed by crimping or swaging in accordance with the present invention.

A preferred embodiment of a three-terminal probe in accordance with the present invention is illustrated in FIG. 2. As shown, a rod-shaped measuring element 10 is surrounded by a tubular insulation layer 12 which is disposed between the measuring element 10 and a tubular-shaped guard shield or guard electrode 14. Guard electrode 14 is similarly surrounded by tubular insulation layer 16 which insulates the guard electrode 14 from ground electrode 34. Those skilled in the art will appreciate that insulation layers 12 and 16 may be preformed insulation tubes having appropriate dimensions for fitting between the respective electrodes of an assembled probe or may be injection molded into the spaces between the electrodes during manufacturing of a molded probe. As shown in FIG. 2, ground electrode 34 can be a standard pipe nipple having threads 36 and 38 for thread mounting of the probe in a container.

The conductive parts of the probe, such as elements 10, 14 and 34, are preferably formed of carbon steel, stainless steel and the like, while the insulation layers 12 and 16, on the other hand, are preferably formed of polymeric or elastomeric materials. These materials are selected such that when used in conjunction with the method of the invention, an integral synergistic seal is maintained even after the probe assembly is subjected to repeated heating and cooling cycles.

As illustrated in FIG. 2, the telescoping design of the probe of the invention provides several potential leakage paths which must be sealed to prevent dangerous leaks. In accordance with the invention, such leakage paths are sealed by concentrically shrinking the outermost diametrical surface of ground electrode 34 by mechanical means such as a crimper or a rotary swager to provide sufficient force to deform the ground electrode 34, the guard electrode 14, the measuring element 10 and insulators 12 and 16 so that multiple seals are created. In particular, as shown in FIG. 2, a hydraulic crimper with an eight segment tool (such as a Finn Power Company model) or a die closing rotary swage-machine applies a squeezing force about the probe at position 40 which is sufficient to uniformly deform the materials around the circumference to seal off all possible leakage paths beneath point 40. For purposes of illustration, this deformation is exaggerated in FIG. 2.

As will be appreciated by those skilled in the art, great pressure applied to the end of the measuring element 10 inside a pressurized vessel may provide sufficient force to cause measuring element 10 to be forced out or "blown" out of the assembly as a projectile unless proper precautions are taken. For this purpose, a circumferential notch 42 is preferably formed in the shaft of the rod-like measuring element 10. Notch 42 provides "blowout protection" by allowing the insulation material to expand into the circumferential notch 42 to form a shoulder which holds the probe element 10 in place. This circumferential notch also improves the seal and aids in holding together the respective parts of the probe assembly. On the other hand, those skilled in the art will appreciate that "blowout protection" may be provided without notching the measuring element 10 by placing a fiberglass cap on the proximal end of the probe or a disk on the distal end of the probe which prevents the measuring element from fitting through the opening in the vessel once inserted.

In a preferred embodiment, the insulators 12 and 16 are formed of a suitable elastomeric material such as polyurethane which is malleable enough to conform to fit the circumferential notch 42 when the rotary swager or crimper applies a force at position 40. Also, it is preferred that the insulation material have "memory" whereby it returns to its original shape after a heating and cooling cycle so that the seal with the electrodes may be maintained even after extreme heating and cooling cycles. In other words, when used with rigid electrodes, an elastomeric insulation material is used which will expand longitudinally along the electrodes during heating and return to its original shape upon cooling so as to maintain a seal after the heating and cooling cycle. On the other hand, if the electrodes are suitably thin so that they expand during heating but do not exceed their elastic limit (and hence return to their original shape upon cooling), the insulators 12 and 16 need not have memory but may instead be formed of Teflon or other polymeric materials without memory. In this configuration, the insulators are permitted to expand radially with the electrodes during heating and thus do not expand longitudinally out the ends of the electrodes. As will be appreciated by those skilled in the art, since there is no longitudinal deformity in the insulators upon heating, contraction of the electrodes causes the insulators 12 and 16 to return to their original shape after cooling. With these principles in mind, those skilled in the art can readily choose suitably elastic insulation materials and electrodes of the proper dimensions to prohibit the formation of leakage paths between the electrodes and insulation layers as a result of heating and cooling action.

Guard element 14 preferably comprises a Cote-Shield ™ Tube of the type manufactured by Drexelbrook Engineering Company which allows capacitive and/or admittance measurements to be taken even when there is material built up on the probe.

Figure 3:
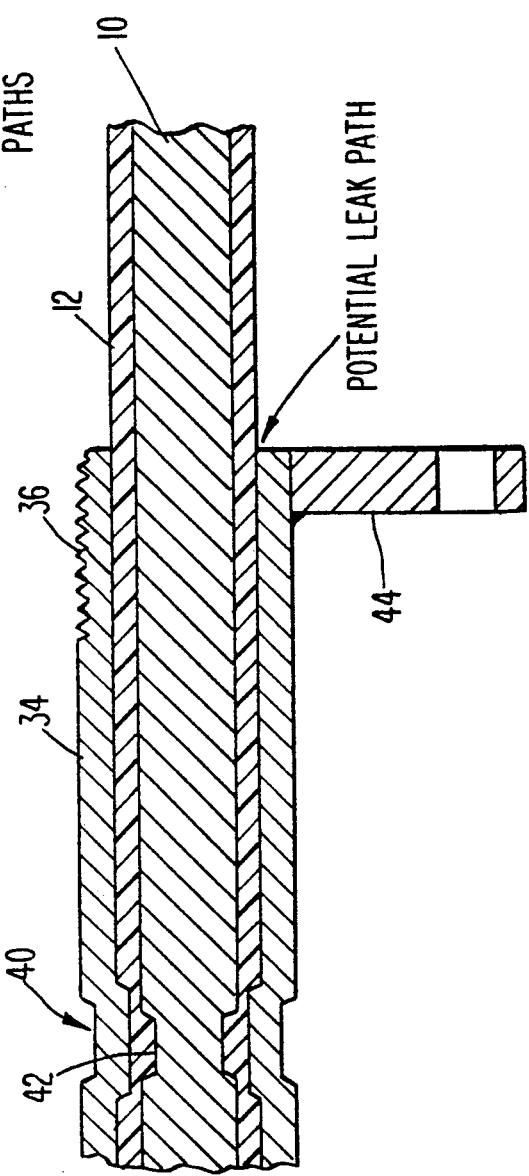
FIG. 3 illustrates a cross-sectional view of a two-terminal probe which is pressure sealed by crimping or swaging in accordance with the present invention.

A preferred embodiment of a two-terminal probe in accordance with the present invention is illustrated in FIG. 3. This probe is similar to the three-terminal probe illustrated in FIG. 2 except that a guard shield and extra insulation layer are not provided. As a result, the crimping or swaging only deforms ground electrode 34 and the insulation layer 12 at position 40 over circumferential notch 42 of the measuring element 10. The embodiment of FIG. 3 also illustrates that a flange 44 may be used for mounting the probe within a container as desired. Of course, a flange may be used for mounting a three-terminal probe as well.

As noted above, the crimping method in accordance with the invention uses a hydraulic crimper with an eight segment tool to crush and deform the metal and insulator to form a seal. The swage method in accordance with the invention, on the other hand, uses a die closing rotary swage machine to deform or shrink the metal concentrically. Those skilled in the art will appreciate that other similar methods may be used to concentrically shrink the outermost diametrical surface to provide sufficient force to deform the materials to form a seal. Accordingly, all such mechanical devices are intended to be within the scope of the invention.

The present invention thus provides an inexpensive technique for sealing potential leak paths without using machined parts and bushings and the like which are expensive to manufacture. The crimping technique is relatively simple and seals off all potential leakage paths, not just those between the measuring element and the guard shield. The technique of the invention also provides a straight forward mechanism for holding all of the parts of the assembly together, which is particularly desirable in the case of assembled probes where the elements are loose fitting and thus have gaps between each of the elements. The probe of the invention also accounts for the effects of temperature variations on the probe by using only those materials which permit a seal to be maintained even after extreme heating and cooling cycles. In this manner, the technique of the invention closes all leakage paths—not just those between the probe and the guard element.

The present invention also provides a mechanism for preventing the measuring element from being blown out of the vessel when high pressure is applied from within the vessel either by providing a circumferential notch in the measuring element at the point of the crimping or swaging or else by providing a fiberglass cap on the proximal end or disk on the distal end of the probe.

Although the present invention has been described with respect to particular embodiments, those skilled in the art will appreciate that the present invention may be modified without departing from the scope of the invention. Accordingly, all such modifications are intended to be included within the scope of the invention as defined by the following claims.

I claim:

1. A probe for measuring the level of a material in a container, comprising:

a rod-shaped probe element having a central axis;

a tubular ground element coaxially surrounding and radially spaced from said probe element but having a length along said central axis which is shorter than a length of said probe element along said central axis whereby said probe element projects from one end of said ground element;

an insulating layer completely surrounding said probe element between said ground element and said probe element to insulate said ground element from said probe element;

a seal formed along said central axis of said probe element by substantially uniformly deforming said ground element and said insulating layer in a radially inward direction towards said probe element until all leakage paths among said probe element, said ground element and said insulating layer are substantially eliminated; and means for mounting said probe within said container for measurement of the level of said material.

2. A probe as in claim 1, wherein said probe element has a circumferential notch along said central axis thereof and said seal is formed at a position above said circumferential notch.

3. A probe as in claim 1, wherein said insulating layer is comprised of an elastomeric material placed between said probe element and said ground element by injection molding and said ground element is rigid.

4. A probe as in claim 1, wherein said insulating layer is comprised of a polymeric material placed between said probe element and said ground element by injection molding and said ground element is slightly deformable within its elastic limit so as to permit said polymeric material to expand radially upon heating thereof.

5. A probe as in claim 1, wherein said seal is formed by one of a rotary swager and hydraulic crimping means which substantially uniformly deform said ground element and said insulating layer in said radially inward direction towards said probe element during manufacture of said probe.

6. A probe as in claim 1, wherein said mounting means comprises at least one of a flange mounting element for flange mounting of said probe and a pipe nipple for thread mounting of said probe.

7. A probe for measuring the level of a material in a container, comprising:

a rod-shaped probe element having a central axis;

a tubular guard element coaxially surrounding and radially spaced from said probe element but having a length along said central axis which is shorter than a length of said probe element along said central axis whereby said probe element projects from one end of said guard element;

a first insulating layer completely surrounding said probe element between said guard element and said probe element to insulate said guard element from said probe element;

a tubular ground element coaxially surrounding and radially spaced from said guard element but having a length along said central axis which is shorter than a length of said guard element along said central axis whereby said guard element projects from one end of said ground element;

a second insulating layer completely surrounding said guard element between said ground element and said guard element to insulate said ground element from said guard element;

a seal formed along said central axis of said probe element by substantially uniformly deforming said guard element, said ground element and said first and second insulating layers in a radially inward direction towards said probe element until all leakage paths among said probe element, said guard element, said ground element and said first and second insulating layers are substantially eliminated; and means for mounting said probe within said container for measurement of the level of said material.

8. A probe as in claim 7, wherein said probe element has a circumferential notch along said central axis thereof and said seal is formed at a position above said circumferential notch.

9. A probe as in claim 7, wherein said first and second insulating layers are comprised of an elastomeric material placed between said probe element and said guard element and between said guard element and said ground element by injection molding and said ground element and guard element are rigid.

10. A probe as in claim 7, wherein said first and second insulating layers are comprised of a polymeric material placed between said probe element and said guard element and between said guard element and said ground element by injection molding and said ground element and guard element are slightly deformable within their elastic limits so as to permit said polymeric material to expand radially upon heating thereof.

11. A probe as in claim 7, wherein said seal is formed by one of a rotary swager and hydraulic crimping means which substantially uniformly deform said guard element, said ground element and said first and second insulating layers in said radially inward direction towards said probe element during manufacture of said probe.

12. A probe as in claim 7, wherein said mounting means comprises at least one of a flange mounting element for flange mounting of said probe and a pipe nipple for thread mounting of said probe.

13. A method of manufacturing a probe for measuring the level of a material in a container, comprising the steps of:

providing a rod-shaped probe element having a central axis;

inserting said probe element into a tubular insulating layer which coaxially surrounds and is radially spaced from said probe element after insertion of said probe element, said insulating layer completely surrounding said probe element;

inserting said probe element and said insulating layer into a tubular ground element which coaxially surrounds and is radially spaced from said insulating layer after insertion of said probe and said insulating layer, said ground element having a length along said central axis which is shorter than a length of said probe element along said central axis whereby said probe element projects from one end of said ground element and is separated from said ground element by said insulating layer;

forming a seal along said central axis of said probe element by substantially uniformly deforming said ground element and said insulating layer in a radially inward direction towards said probe element until all leakage paths among said probe element, said ground element and said insulating layer are substantially eliminated; and mounting a resulting assembly within said container for measurement of the level of said material.

14. A method as in claim 13, comprising the further step of forming a circumferential notch in said probe element along said central axis thereof, and said seal forming step includes the step of forming said seal at a position above said circumferential notch.

15. A method as in claim 13, wherein said seal forming step comprises the steps of inserting said assembly into a rotary swager and substantially uniformly deforming said ground element and said insulating layer in said radially inward direction towards said probe element using said rotary swager.

16. A method as in claim 13, wherein said seal forming step comprises the step of crimping said assembly to substantially uniformly deform said ground element and said insulating layer in said radially inward direction towards said probe element using a hydraulic crimping device.

17. A method of manufacturing a probe for measuring the level of a material in a container, comprising the steps of:

providing a rod-shaped probe element having a central axis;

placing a tubular ground element so as to coaxially surround and be radially spaced from said probe element, said ground element having a length along said central axis which is shorter than a length of said probe element along said central axis whereby said probe element projects from one end of said ground element after placement;

injection molding insulation material in a one-piece unitary construction surrounding said probe element between said probe element and said ground element such that said insulation material completely insulates said probe element from said ground element;

forming a seal along said central axis of said probe element by substantially uniformly deforming said ground element and said insulation material in a radially inward direction towards said probe element until all leakage paths among said probe element, said ground element and said insulation material are substantially eliminated; and mounting a resulting assembly within said container for measurement of the level of said material.

18. A method as in claim 17, comprising the further step of forming a circumferential notch in said probe element along said central axis thereof I and said seal forming step includes the step of forming said seal at a position above said circumferential notch.

19. A method as in claim 17, wherein said seal forming step comprises the steps of inserting said assembly into a rotary swager and substantially uniformly deforming said ground element and said insulation material in said radially inward direction towards said probe element using said rotary swager.

20. A method as in claim 17, wherein said seal forming step comprises the step of crimping said assembly to substantially uniformly deform said ground element and said insulation material in said radially inward direction towards said probe element using a hydraulic crimping device.

21. A method of manufacturing a probe for measuring the level of a material in a container, comprising the steps of:

providing a rod-shaped probe element having a central axis;

inserting said probe element into a first tubular insulating layer which coaxially surrounds and is radially spaced from said probe element after insertion of said probe element, said first insulating layer completely surrounding said probe element;

inserting said probe element and said first insulating layer into a tubular guard element which coaxially surrounds and is radially spaced from said first insulating layer after insertion of said probe and said first insulating layer, said guard element having a length along said central axis which is shorter than a length of said probe element along said central axis whereby said probe element projects from one end of said guard element and is separated from said guard element by said first insulating layer;

inserting said probe element, said first insulating layer and said guard element into a second tubular insulating layer which coaxially surrounds and is radially spaced from said guard element after insertion of said guard element, said second insulating layer completely surrounding said guard element;

inserting said probe element, said first insulating layer, said guard element and said second insulating layer into a tubular ground element which coaxially surrounds and is radially spaced from said guard element, said ground element having a length along said central axis which is shorter than a length of said guard element along said central axis whereby said guard element projects from one end of said ground element;

forming a seal along said central axis of said probe element by substantially uniformly deforming said ground element, said guard element and said first and second insulating layers in a radially inward direction towards said probe element until all leakage paths among said probe element, said ground element, said guard element and said first and second insulating layers are substantially eliminated; and mounting a resulting assembly within said container for measurement of the level of said material.

22. A method as in claim 21, comprising the further step of forming a circumferential notch in said probe element along said central axis thereof, and said seal forming step includes the step of forming said seal at a position above said circumferential notch.

23. A method as in claim 21, wherein said seal forming step comprises the steps of inserting said assembly into a rotary swager and substantially uniformly deforming said ground element, said guard element, and said first and second insulating layers in said radially inward direction towards said probe element using said rotary swager.

24. A method as in claim 21, wherein said seal forming step comprises the step of crimping said assembly to substantially uniformly deform said ground element, said guard element, and said first and second insulating layers in said radially inward direction towards said probe element using a hydraulic crimping device.

25. A method of manufacturing a probe for measuring the level of a material in a container, comprising the steps of:

providing a rod-shaped probe element having a central axis;

placing a tubular guard element so as to coaxially surround and be radially spaced from said probe element, said guard element having a length along said central axis which is shorter than a length of said probe element along said central axis whereby said probe element projects from one end of said guard element after placement;

placing a tubular ground element so as to coaxially surround and be radially spaced from said guard element, said ground element having a length along said central axis which is shorter than a length of said guard element along said central axis whereby said guard element projects from one end of said ground element after placement;

injection molding insulation material in a one-piece unitary construction surrounding said probe element between said probe element and said guard element and surrounding said guard element between said guard element and said ground element such that said insulation material completely insulates said probe element from said guard element and said guard element from said ground element;

forming a seal along said central axis of said probe element by substantially uniformly deforming said ground element, said guard element and said insulation material in a radially inward direction towards said probe element until all leakage paths among said probe element, said ground element, said guard element, and said insulation material are substantially eliminated; and mounting a resulting assembly within said container for measurement of the level of said material.

26. A method as in claim 25, comprising the further step of forming a circumferential notch in said probe element along said central axis thereof, and said seal forming step includes the step of forming said seal at a position above said circumferential notch.

27. A method as in claim 25, wherein said seal forming step comprises the steps of inserting said assembly into a rotary swager and substantially uniformly deforming said ground element, said guard element, and said insulation material in said radially inward direction towards said probe element using said rotary swager.

28. A method as in claim 25, wherein said seal forming step comprises the step of crimping said assembly to substantially uniformly deform said ground element, said guard element, and said insulation material in said radially inward direction towards said probe element using a hydraulic crimping device.

29. A method of manufacturing a probe for measuring the level of a material in a container, comprising the steps of:

providing a rod-shaped probe element having a central axis;

placing a rigid guard element so as to coaxially surround and be radially spaced from said probe element, said guard element having a length along said central axis which is shorter than a length of said probe element along said central axis whereby said probe element projects from one end of said guard element after placement;

injection molding elastomeric insulation material in a one-piece unitary construction surrounding said probe element between said probe element and said guard element such that said insulation material completely insulates said probe element from said guard element, said insulation material expanding longitudinally along said probe element when heated and contracting its original shape when cooled;

forming a seal along said central axis of said probe element by substantially uniformly deforming said guard element and said insulation material in a radially inward direction towards said probe element until all leakage paths among said probe element, said guard element, and said insulation material are substantially eliminated; and mounting a resulting assembly within said container for measurement of the level of said material.

30. A method of manufacturing a probe for measuring the level of a material in a container, comprising the steps of:

providing a rod-shaped probe element having a central axis;

placing a guard element so as to coaxially surround and be radially spaced from said probe element, said guard element having a length along said central axis which is shorter than a length of said probe element along said central axis whereby said probe element projects from one end of said guard element after placement, wherein and said guard element is slightly deformable within its elastic limit;

injection molding elastomeric insulation material in a one-piece unitary construction surrounding said probe element between said probe element and said guard element such that said insulation material completely insulates said probe element from said guard element, said insulation material comprising a polymeric material which expands radially with said guard element upon heating thereof;

forming a seal along said central axis of said probe element by substantially uniformly deforming said guard element and said insulation material in a radially inward direction towards said probe element until all leakage paths among said probe element, said guard element, and said insulation material are substantially eliminated; and mounting a resulting assembly within said container for measurement of the level of said material.

* * * * *

UNITED STATES PATENT AND TRADEMARK OFFICE
CERTIFICATE OF CORRECTION

PATENT NO. : 5,307,678
DATED : May 3, 1994
INVENTOR(S) : Cost

It is certified that error appears in the above-identified patent and that said Letters Patent is hereby corrected as shown below:

Column 5, line 19, change "abovementioned" to --above-mentioned--.

Column 6, line 9, change "-machine" to --machine--.

Column 6, line 68, change "Shield TM" to --Shield™--.

Column 10, line 42, change "thereof I" to --thereof,--.

Signed and Sealed this

Sixteenth Day of August, 1994

Attest:

BRUCE LEHMAN

*Attesting Officer*      *Commissioner of Patents and Trademarks*